(12) United States Patent
Lusetti et al.

(10) Patent No.: US 8,346,991 B2
(45) Date of Patent: Jan. 1, 2013

(54) MULTI-FUNCTION PERIPHERAL DEVICE, CORRESPONDING METHOD AND ELECTRONIC SYSTEM HAVING A PERIPHERAL AND A HOST COMMUNICATING VIA A SINGLE INTERFACE

(75) Inventors: Jean Lusetti, Marseilles (FR); Nathalie Guille, La Ciotat (FR)

(73) Assignee: Gemalto SA, Meudon (FR)

( * ) Notice: Subject to any disclaimer, the term of this patent is extended or adjusted under 35 U.S.C. 154(b) by 371 days.

(21) Appl. No.: 12/307,543

(22) PCT Filed: Jun. 22, 2007

(86) PCT No.: PCT/EP2007/056257
§ 371 (c)(1),
(2), (4) Date: Jan. 16, 2009

(87) PCT Pub. No.: WO2008/003599
PCT Pub. Date: Jan. 10, 2008

(65) Prior Publication Data
US 2009/0210569 A1    Aug. 20, 2009

(30) Foreign Application Priority Data
Jul. 5, 2006  (FR) ..................... 06 06167

(51) Int. Cl.
*G06F 3/00* (2006.01)
*G06F 13/00* (2006.01)
(52) U.S. Cl. .............................. 710/16; 710/10; 710/33
(58) Field of Classification Search .................... 710/10, 710/16, 33
See application file for complete search history.

(56) References Cited

U.S. PATENT DOCUMENTS

| | | | |
|---|---|---|---|
| 6,754,725 B1 * | 6/2004 | Wright et al. | 710/8 |
| 6,898,653 B2 * | 5/2005 | Su et al. | 710/302 |
| 2001/0025882 A1 | 10/2001 | Coulier | |
| 2004/0073726 A1 * | 4/2004 | Margalit et al. | 710/72 |
| 2006/0208066 A1 * | 9/2006 | Finn et al. | 235/380 |
| 2007/0045417 A1 | 3/2007 | Tsai et al. | |

FOREIGN PATENT DOCUMENTS

EP  1 473 664 A2  11/2004
WO  WO 2005/008453 A1  1/2005

OTHER PUBLICATIONS

Form PCT/ISA/210 (International Search Report) dated Oct. 2, 2007.

* cited by examiner

*Primary Examiner* — Chun-Kuan Lee
*Assistant Examiner* — Zachary K Huson
(74) *Attorney, Agent, or Firm* — Buchanan Ingersoll & Rooney PC

(57) ABSTRACT

The invention relates to an electronic system having at least one host processing electronic device and at least one peripheral electronic device. The peripheral electronic device performs at least two functions. The host processing electronic device and the peripheral electronic device are interconnected via at least one interface. The host processing electronic device and the peripheral electronic device communicate via a single, common, "multi-function" interface, so that the host processing electronic device and the peripheral electronic device exchange at least one item of data relative to each of the two functions via the multi-function interface.

18 Claims, 1 Drawing Sheet

MULTI-FUNCTION PERIPHERAL DEVICE, CORRESPONDING METHOD AND ELECTRONIC SYSTEM HAVING A PERIPHERAL AND A HOST COMMUNICATING VIA A SINGLE INTERFACE

TECHNICAL FIELD OF THE INVENTION

The invention relates to multi-function peripheral electronic devices, and more particularly to multi-function peripheral electronic devices, each being provided with a smart card reader.

The term "peripheral electronic device" or "peripheral" is used within the present description to mean an element of computer hardware that is distinct from a host processing electronic device, also referred as a "host" below, with which it can be coupled, in order to use, at least in part, the functions that the peripheral has at its disposal.

The peripheral is designed to co-operate with a host, such as a host personal computer (PC), a mobile telephone, or a personal digital assistant (PDA).

In general, a host acts as master, while a peripheral acts as slave. The multi-function peripheral executes one or more functions solicited by the host, and can transmit data to the host, in response to a command originating from the host.

The invention also relates to a method of communication between a host processing electronic device and a corresponding multi-function peripheral electronic device.

STATE OF THE ART

Patent Document EP 1 473 664 A2 describes, in particular, a multi-function peripheral that has two functions, namely a smart card reader function and a data storage function.

In order to access the smart card reader function, a smart card is inserted into the smart card reader peripheral which is itself connected to the host PC.

It is the host PC that controls the communication with the multi-function peripheral through two distinct interfaces, namely a chip/smart card interface and a mass storage interface, in order to retrieve data stored either in the inserted smart card or in a memory specific to the multi-function peripheral.

A particular object of the present invention is to provide a multi-function peripheral electronic device, a corresponding electronic system, and a corresponding method of communication between a multi-function peripheral and a host that offer a technical solution that is an alternative to the known solution, while guaranteeing access to a plurality of functions from the host.

SUMMARY OF THE INVENTION

The present invention achieves this object, and other objects that appear below, by means of an electronic system, said electronic system comprising at least one host processing electronic device and at least one peripheral electronic device, said peripheral electronic device being suitable for performing at least two functions, said host processing electronic device and said peripheral electronic device being interconnected via at least one interface.

According to the invention, said host processing electronic device and said peripheral electronic device are suitable for communicating via a single, common, "multi-function" interface, so that said host processing electronic device and said peripheral electronic device exchange at least one item of data relative to each of said at least two functions via said multi-function interface.

The general principle of the invention is thus based on inserting a single interface between the host and the multi-function peripheral, making it possible to transmit, from the host to the multi-function peripheral or from the multi-function peripheral to the host, data specific to at least one of the functions available at the multi-function peripheral.

Thus, unlike the technical solution known from the above-mentioned patent document, the invention is based on a novel approach whereby the same interface can manage a plurality of functions, rather than having one dedicated interface for each function, requiring a number of interfaces that is identical to the number of functions offered by the multi-function peripheral.

Therefore, it can be understood that only a single communication protocol may be necessary for communicating data relating to any one of the functions available at the multi-function peripheral.

In this way, the invention thus proposes a technical solution that is simple and that optimizes the manufacturing and development costs, in particular for manufacturing and developing the corresponding multi-function peripheral, compared with the above-mentioned technical solution.

In a preferred embodiment, said peripheral electronic device comprises a central processing unit also termed "peripheral CPU", said peripheral CPU being connected to said multi-function interface, and said multi-function interface has a number of communication channels that is optimal, said optimal number of communication channels corresponding to the number of communication channels relating to a function selected from the set comprising said at least two functions and requiring the larger or largest number of communication channels when a peripheral electronic device is suitable for performing a function selected individually from the set comprising said at least two functions, via a single, common, multi-function interface, for the purpose of exchanging, with said host processing electronic device, at least one item of data relating to the selected function.

In other words, the microprocessor of the multi-function peripheral manages a single interface that presents a number of communication channels that is equal to the number of communication channels necessary for an interface known from the above mentioned prior art that manages a single function chosen from among the available functions and that requires the larger or largest number of communication channels, such a known interface being implemented with a central processing unit managing and controlling one dedicated interface per offered function.

Since the multi-function interface has a number of communication channels that is independent of the total number of communication channels corresponding to the sum of all of the communication channels necessary for each function taken individually to operate, the technical implementation of the multi-function peripheral electronic device is simpler than indicated above.

In a preferred embodiment, said peripheral electronic device includes analysis means for analyzing at least one item of data, said analysis means analyzing at least one item of data coming from said host processing electronic device, so that said peripheral electronic device detects the function concerned by said at least one item of data analyzed from among the set comprising said at least two functions, and said peripheral electronic device includes data routing means, said data routing means routing said at least one item of data, while taking account of the function concerned and detected, to means specific to the function concerned and detected, so that said peripheral electronic device processes said at least one item of data by using means dedicated to one of said at least two functions.

In other words, the data coming from the host is firstly analyzed and then routed, within the multi-function peripheral, towards means that are identified and that are separate from the means specific to another function which is not concerned.

In a particular embodiment, with said host processing electronic device including first command means for a first function and second command means for a second function, at least one of said functions being available natively within an operating system of said host processing electronic device, in such a particular embodiment, said host processing electronic device includes bus driver means for each of the non-native functions, said bus driver means for each of the non-native functions being connected firstly to said first command means for said first function, and secondly to said second command means for said second function, so that said bus driver means of each of the non-native functions are suitable for transmitting, via said first command means for said first function, at least one item of data sent from said second command means for said second function to said peripheral electronic device and/or said bus driver means for each of the non-native functions are suitable for receiving from said peripheral electronic device, via said first command means for said first function, at least one item of data sent from said peripheral electronic device to said second command means for said second function.

Thus, the bus driver means can adapt the data format of each command dedicated to a function other than a native function provided within the operating system of the host, so as to be capable of recognizing and of communicating with the means dedicated to a function that is not already initially recognized by the host.

In a particular embodiment, a first function is a data storage function for storing at least one item of data, and a second function is a smart card reader function, and the communication protocol used between said host processing device and said peripheral electronic device via said multi-function interface relates to the data storage function for storing at least one item of data.

It can be understood that a single communication protocol is necessary for exchanging, between the host and the multi-function peripheral, data relating to any one of the functions available within the multi-function peripheral.

In a preferred embodiment, said multi-function interface has at least two communication channels, said at least two communication channels comprising at least one incoming communication channel and at least one outgoing communication channel relative to said peripheral electronic device.

It can easily be understood that the multi-function interface can respectively have at least one outgoing communication channel and at least one incoming communication channel, as seen from the host side.

In other words, the communication protocol for communications between the host and the multi-function peripheral requires that either the host transmit the data to the multi-function peripheral or that the multi-function peripheral transmit data to the host. Such a communication protocol characterizes a "semi-duplex" communication protocol, in which one of the two elements comprising the host and the multi-function peripheral transmits data, and the other receives.

In an advantageous embodiment of the invention, said host processing device includes command encapsulation means, said command encapsulation means encapsulating a command dedicated to one of said at least two functions within a command dedicated to another of said at least two functions, and said peripheral electronic device includes response encapsulation means for encapsulating a response to the command, which response encapsulation means encapsulate the response to the command dedicated to one of said at least two functions within a response dedicated to another of said at least two functions.

Naturally, the multi-function peripheral includes means for recognizing and extracting data relating to a command dedicated to another function, e.g. a second function, from data relating to a command dedicated to a first function.

Likewise, the host includes means for recognizing and extracting data relating to a response relating to a second function from data relating to a response dedicated to the first function coming from data transmitted by the multi-function peripheral.

The invention also provides a corresponding peripheral electronic device.

It should be noted that the same housing can contain a host processing electronic device and such a peripheral electronic device.

The multi-function peripheral electronic device of the invention represents a technical solution that is simpler compared with the above-described technical solution.

A peripheral CPU, e.g. constituted by a microprocessor, with which the peripheral electronic device is provided, offers a single interface for accessing the various functions that it offers.

Unlike the technical solution that is known from the above-mentioned patent document, such a solution does not require the use of a multi-function peripheral that is made complex by being provided with a microprocessor capable of managing a plurality of interfaces. Since the technical complexity and the price of a microprocessor is generally directly proportional to the number of interfaces, the multi-function peripheral of the invention is simpler and thus less costly than the state-of-the-art multi-function peripheral.

With said electronic device including data storage means for storing at least one item of data, said data storage means including an auto-run file, the storage function for storing at least one item of data being available natively within an operating system of said external electronic device, in an advantageous embodiment, said auto-run file includes a tool that can be run from an external electronic device and that is suitable for auto-installing bus driver means for each of the non-native functions.

It can be understood that the auto-run file, also conventionally referred to as the "autorun.inf", makes it possible to load automatically bus driver means for a smart card reader in a particular embodiment of the invention.

Thus, the device of the invention makes it possible to load and to install automatically a computer driver also termed "driver", not natively present within the operating system of the host, as an external electronic device so as to make any function with which the peripheral is provided accessible to a user.

The term "driver" is used herein to mean a computer program optionally accompanied with configuration files, and designed to enable another program, such as an operating system of the host, to communicate with a peripheral.

The invention also provides a method of communication between at least one host processing electronic device and at least one peripheral electronic device.

DESCRIPTION OF THE FIGURES OF THE DRAWING

Other characteristics and advantages of the invention appear on reading the following description of a preferred embodiment and of preferred implementations of the invention given merely by way of non-limiting indication, and on examining the accompanying drawing, in which.

DESCRIPTION OF A PREFERRED EMBODIMENT AND OF PREFERRED IMPLEMENTATIONS OF THE INVENTION

In the description below, consideration is given to an electronic system comprising a PC and a smart card reader that are interconnected via a port of the Universal Serial Bus (USB) type.

It is recalled that the term "bus" is generally used to designate the set of communication lines that convey data between a central processing unit (CPU) of a PC and peripheral to which the PC is connected.

In the description below, the bus is a standardized USB. Such a type of USB is used for connecting various types of peripheral, in particular to a PC. The USB is an interface bus which makes it possible for any equipment using it to operate on the "plug and play" principle, i.e. the user does not need to take any action in order to parameterize the communication so as to cause the peripheral to co-operate with the host to which it is connected. The USB can be managed under the Microsoft Windows (registered trademark) operating system, and in particular, under the latest version of that operating system, namely Windows XP service Pack 2.

Clearly, however, the invention applies to any type of peripheral bus, such as a personal computer interface (PCI) or a PCMCIA (Personal Computer Memory Card International Association) peripheral bus, or a bus of some other type, associated with any other PC operating system.

The general principle of the invention is based on interconnecting a single interface between a host processing electronic device, such as a PC, and a peripheral electronic device offering a plurality of functions, in order to exchange data specific to one of the functions available in the peripheral.

The present invention proposes simple and high-performance software architecture for implementing the host processing electronic device and the multi-function peripheral electronic device.

It should be noted that the invention stems from an approach opposite from the approach of the person skilled in the art whereby the person skilled in the art is prompted to use one interface per function offered by the peripheral, and thus a number of interfaces equal to the number of functions offered by the peripheral.

As a result, with the invention, the complexity of the interfacing is reduced on either side of the interface, namely on the PC side and on the peripheral side compared with the interfacing complexity of the state of the art.

Figure 1:
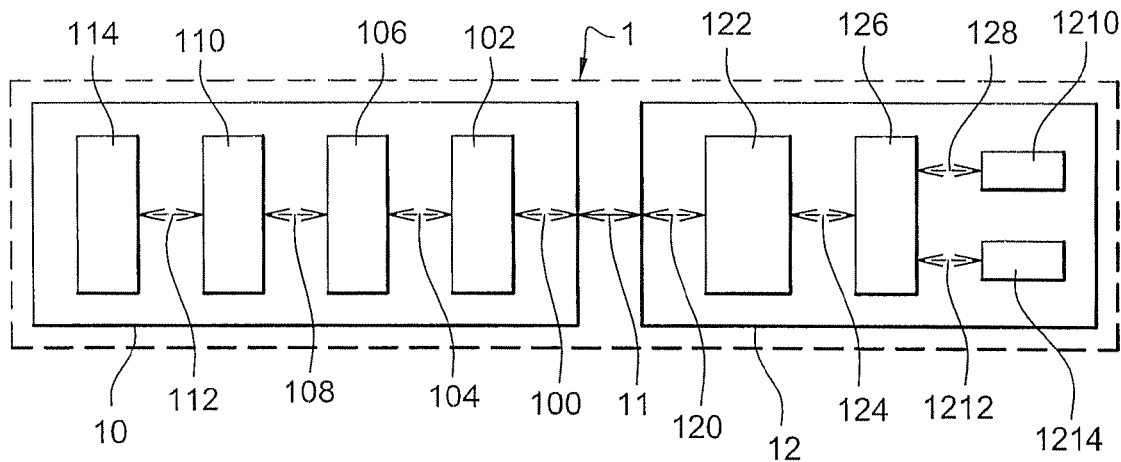
FIG. 1 shows a simplified block diagram of a preferred embodiment of an electronic system of the invention.

As shown by way of example in FIG. 1, an electronic system 1 comprises a host PC 10 and a smart card reader USB peripheral 12, each of which has software means that are described below.

The smart card reader USB peripheral 12 is removable. More exactly, the smart card reader USB peripheral 12 can be connected to and disconnected from the PC 10 without preventing the PC from operating and without having to switch it off.

It should be noted that, in the context of the invention, the peripheral can be either external to the host, i.e. the peripheral is plugged into a connector that is accessible from the outside of a housing constituting the outer shell of the host, or else internal to the host, i.e. the peripheral is plugged directly into the mother board incorporated inside the housing of the host.

The smart card reader USB peripheral 12 makes it possible to access data that is stored in a smart card (not shown). Such data is, for example, specific to a user of the smart card. The smart card can thus be involved, for example, in a transaction, such as electronic payment for an article or a service proposed on an Internet site, and, for example, stores a personal identification number (PIN), and communicates, via the smart card reader, with the host PC for the purpose of authorizing the transaction.

The peripheral 12 has means dedicated to two distinct functions, such as a disk data storage unit 1210 and a smart card reader 1214. The disk data storage unit 1210 is designed to store data using a communication protocol while the smart card reader 1214 is designed to read a smart card (not shown).

Naturally, although only these two functions are mentioned for reasons of simplicity, it is clear that other functions can be incorporated within the multi-function peripheral without going beyond the ambit of the present invention.

The PC 10 is connected to the peripheral 12 via a single, common multi-function interface 11 enabling them to exchange data specific to either one of the two functions.

For this purpose, the peripheral 12 is provided with a microprocessor 122 as a CPU, having a number of communication channels that is small relative to a total number of communication channels representing the sum of the numbers of communication channels specific to each of the functions offered by the peripheral resulting from the known technical solution.

The multi-function interface 11 includes a number of communication channels that is limited to two (not shown) for performing a data storage first function and for performing a smart card reader second function (and not four communication channels corresponding to the sum of the number of communication channels relating both to a multi-function interface specific to the data storage function and also to a multi-function interface specific to the smart card reader function as in the above-mentioned prior art). More precisely, on the multi-function peripheral side 12, the multi-function interface 11 includes an outgoing communication channel and an incoming communication channel (not shown) also referred to by the term "endpoint" in the terminology of the USB Standard.

It can be understood that the number of communication channels of the multi-function interface 11 is equal to the higher or highest number of communication channels specific to single-function interfaces specific to the functions offered by the peripheral 12 which would be used in known manner. For example, if a peripheral offered a first function requiring a single-function interface having four communication channels and a second function requiring a single-function interface having two communication channels, a multi-function peripheral of the invention offering two functions would require one multi-function interface having four communication channels only.

In other words, it is possible to offer a larger number of functions while using a multi-function peripheral in which the number of communication channels does not exceed the maximum number of communication channels that would be used for a single-function peripheral offering one function only.

Therefore, a single communication protocol specific, for example, to the single function of data storage is necessary for exchanging data between the PC 10 and the peripheral 12, in order to manipulate data specific to the two available functions.

Within the multi-function peripheral, a microprocessor 122 manages and controls the data received from the PC 10 and the data to be transmitted to the PC 10. The microprocessor 122 exchanges data relating to the data storage function or to the smart card reader function firstly via a both-way link 120, via the multi-function intermediate interface 11, with an external electronic device, namely, in the example, with the PC 10, and secondly via internal other links, such as the links described below, with means that are separate and dedicated to the various functions.

The microprocessor 122 is connected, via a both-way link 124, to routing means 126.

The routing means 126 analyze, in particular, the data transmitted from the PC 10, in order to determine which means are the destination means to which the received data should be routed, namely whether they are means specific to the data storage function or means specific to the smart card reader function. In this way, the function concerned by the received data is detected. Once the data has been analyzed, the routing means 126 route it and direct it either, via a first both-way link 128, to the data storage unit 1210, or, via a second both-way link 1212, to the smart card reader 1214, in order to have the received data processed by the function in question.

The routing function is present in the form of embedded software stored within the data storage unit 1210 of the multi-function peripheral 12.

In addition, the routing means 126 convert the response data specific to the smart card reader function into data that is preferably in a proprietary data format, so that the driver dedicated to the card reader function can recognize the response to a command that it has transmitted.

For this purpose, the routing means 126 are suitable for encapsulating data coming from means 1214 dedicated to the card reader function within data of a response relating to the data storage function, in a proprietary format. In this way, when a response related to the smart card reader function is to be delivered by the multi-function peripheral 12, consequent upon the command from the host PC 10, the corresponding data coming form the smart card (not shown) is conveyed within a created response that complies with a data format specific to the data format of a response related to the data storage function.

The PC 10 includes a controller 102 of the host. The controller 102 of the host is, with respect to external peripherals, designed to receive, via a both-way link 100, data coming from the multi-function peripheral 12 and to transmit data whose destination is either the data storage unit 1210 or the smart card reader 1214.

Inside the PC 10, the controller 102 of the host is connected, via a both-way link 104, to a first driver 106 relating to the data storage function relating to a first function available at the multi-function peripheral 12.

It should be noted that, in a variant embodiment, a plurality of drivers that are suitable for performing the data storage function are provided.

The first driver 106 is responsible for all of the commands whose destination is the data storage function. The first driver 106 generates and transmits a first command relating to the data storage function.

The first pilot 106 is connected, via a both-way link 108, to a smart card reader bus driver 110. The smart card reader bus driver 110 is used to convert data specific to the smart card reader function. The conversion is performed by encapsulating data relating to a command specific to the smart card reader function within a proprietary command specific to the data storage function provided for by the Small Computer System Interface (SCSI) Standard, authorizing proprietary data exchange, or by extracting data relating to a response to a command specific to the smart card reader function from a response to a proprietary command relating to the data storage function.

Thus, it can be understood that the format of the command or of the response to the command that is specific to the second function is transformed into a format of the command or of the response that is specific to the first function so as to be transparent at the multi-function interface 11, and so as to use a single communication protocol for communications between the PC 10 and the multi-function peripheral 12.

The smart card reader bus driver 110 is connected, via a both-way link 112, to a second driver 114 relating to the smart card reader function.

The second driver 114 is responsible for all of the commands whose destination is the smart card reader function. The second driver 114 generates and transmits a second command relating to a second function available at the multi-function peripheral 12.

The multi-function peripheral 12 that is newly connected to the PC 10 can, dynamically, declare all of the functions that it is capable of performing.

The term "dynamically" in the preceding sentence is used, in particular, to indicate that an operating system of the host is already operating when the peripheral is connected.

Thus, the user of the host PC 10 does not need to reboot the operating system of the host in order to allow any multi-function peripheral to announce the functions that it performs.

In a variant embodiment (not shown), the second driver relating to the second function is connected directly to the first driver relating to the first function. In such a variant, it is the second driver which is responsible for all of the commands whose destination is the second function available in the multi-function peripheral. The second driver not only generates and transmits a command relating to the smart card reader function but it also converts the command or the response relating to the smart card reader function to the desired format that is specific to the command or the response relating to the data storage function.

In known manner, it is recalled that the communication protocol specific to the smart card reader function, such as USB device class specifications for USB CCIDs (Chip/Smart Card Interface Devices), uses a data format with which a command transmitted to the smart card reader from the host is constituted by a header part optionally supplemented with data specific to the command, and by another data part. The header defines the functionality of the required command such as card switch-on, or data exchange, inter alia, and occupies a ten-byte space. Any data supplementing the header specifies the command in more detail.

Likewise, a response from the smart card reader to the host is also constituted by a header occupying ten bytes. The response defines the result of proper performance of the transmitted command optionally supplemented with data.

The communication protocol used between the smart card reader and the smart card complies with ISO (international Standards Organization) Standard 7816-3. Such a communication protocol is a semi-duplex protocol, i.e. consecutively, the smart card reader can transmit a command to the card, and the card can transmit data to the card reader. An example of a command for switching on the card is given below:

TABLE 1

| direction | 10-byte header | data |
|---|---|---|
| From the host to the smart card reader | 62 00 00 00 00 00 00 01 00 00 (62 = card switch on) | none |
| From the smart card reader to the host | 80 16 00 00 00 00 00 00 00 00 | ATR card = 3B 9F 95 80 1F C2 80 31 E0 73 FE 21 1B 63 E2 07 A7 83 0F 90 00 8C |

The acronym ATR stands for "Answer To Reset" and announces the identification number of the smart card inserted with the functionalities that the card offers. Thus, an application compatible with the PC 10 can be run. Such an application (not shown) is connected to the second driver 114.

Two new commands dedicated to processing data specific to the smart card reader function of the CCID Standard are generated in a proprietary format of the SCSI standard, such as:

TABLE 2

| SCSI command block | | | | |
|---|---|---|---|---|
| Cmd | P1 | P2 | Following portion of the message | data |
| $F0 | $47 | $01 | CCID header from the host to the card | XX |
| $F0 | $47 | $02 | none | XX |

The two commands are generated at the bus driver 110.

A command conveys the data transmitted from the PC 10 to the smart card, via the smart card reader and the multi-function interface, as a command proper of the smart card reader function. For example, it is the first row of Table 2 above in the proprietary format.

A command of the CCID type format of the smart card reader function is encapsulated within a proprietary command of the SCSI type format of the data storage function, e.g. in the following manner, during a first exchange for transmitting the command proper to the smart card:

TABLE 3

| From the host to the smart card reader | 31-byte header, USB data storage class | | data |
|---|---|---|---|
| | start of header | command block | none or optionally data |
| | (31-16) bytes: XX XX XX XX XX XX XX XX | F0 47 01 62 00 00 00 00 00 00 01 00 00 00 00 00 | |
| From the smart card reader to the host | Status, USB data storage class | | data |
| | XX XX | | none |

Within the command block of the command proper, the "proprietary" characters "F0 47 01" are added and the control characters of the command of the smart card reader function are conserved.

Another command conveys the data transmitted from the card via the smart card reader and the multi-function interface, as a corresponding response from the smart card to the PC 10. For example, it is the second row of Table 2 above in the proprietary format.

A response in the CCID type format of the smart card reader function is encapsulated within a proprietary command of the SCSI type format of the data storage function, e.g. in the following manner, during a second exchange for transmitting the response from the smart card:

TABLE 4

| From the host to the smart card reader | 31-byte header, USB data storage class | | data |
|---|---|---|---|
| | start of header | command block | none |
| | (31-16) octets: XX XX XX XX XX XX XX XX | F0 47 02 00 00 00 00 00 00 00 00 00 00 00 00 00 | |
| From the smart card reader to the host | Status, USB data storage class | | data |
| | XX XX | | 80 16 00 00 00 00 00 00 00 00 3B 9F 95 80 1F C2 80 31 E0 73 FE 21 1B 63 E2 07 A7 83 0F 90 00 8C |

The person skilled in the art recognizes the known elements present in Tables 3 and 4 from the new elements which are underlined.

Likewise, the person skilled in the art recognizes that the communication protocol specific to the data storage function such as SCSI is used and adapted to be capable of also conveying data relating to the card reader function in a proprietary format.

Each of the commands of the resulting adapted protocol that are transmitted by the PC 10 is constituted by a header that is 31 eight-bit bytes in length and optionally by data. The data transmitted via the multi-function interface 11 complies with the USB mass storage class, regardless of the transmission direction.

The header is composed firstly of a signature making it possible to identify a command of the data storage function, secondly of various items of data, and thirdly of a command block. The command block comprises 16 bytes, the first of which indicates the functionality of the command, such as, inter alia, reading from the memory or writing in the memory, and the following bytes indicate various parameters depending on the solicited functionality.

Each of the responses of the resulting adapted protocol is constituted by data and by a status block. The data is present assuming that the command transmitted by the PC 10 does not itself include any data due to the fact that the protocol is a semi-duplex protocol. The status block indicates whether the solicited command has been executed correctly or erroneously.

It can be understood that, when the multi-function peripheral 12 receives a command that is in SCSI format and that has a header in which the first block of the command block is F0 in hexadecimal, the multi-function peripheral 12, and more exactly the routing means 26 deduce, after consulting it, that the function concerned is the smart card reader function, and the command is processed by the means 1214 dedicated to the smart card reader function. For all of the other commands, their destination remains the data storage unit 1210 which processes them. Thus, an application (not shown) that is operated under Windows Explorer and that is connected to the first driver 106 can use the data storage function.

The data storage unit 1210 stores data, in particular data specific to an auto-run file also referred to as an "autorun.inf" that runs automatically on the PC 10.

It is recalled that, in order to communicate between the multi-function peripheral 12 and the PC 10, each function to be made accessible needs its own driver.

In this example, firstly the data storage driver is necessary for the data storage function, and the smart card reader driver is also necessary for the smart card reader function. Once the multi-function peripheral 12 is connected, it has the data storage function. The data storage function is then associated by the Windows operating system equipping the personal commuter 10 with its data storage driver, in native manner, i.e. in a manner such that it is already loaded and present within the operating system.

The smart card reader function remains to be recognized by the operating system which cannot be driven directly by the smart card reader driver.

According to an advantageous characteristic of the invention, the auto-run file includes a tool that can be run from the PC 10 and that is suitable for loading the smart card reader bus driver 110 automatically into the PC 10.

The mere fact that the multi-function peripheral 12 is connected to the PC 10 triggers auto-configuration of the PC 10 so as to recognize and use all of the functions available at the multi-function peripheral 12. Thus, the "plug and play" principle relative to the multi-function peripheral 12 whereby the user does not have to act in order to have it co-operate with the PC 10 is preserved, while also guaranteeing access to a plurality of available functions.

In particular, the bus driver 110 performs the two functions, namely monitoring the connection/disconnection of the multi-function peripheral 12, and converting the CCID commands or responses into commands and responses relative to the data storage function or "SCSI_PASSTHROUGH" in a proprietary format as defined above.

On detecting connection of the multi-function peripheral 12, the bus driver 110 indicates to the Windows operating system the presence of a new peripheral that will be handled by the second driver 114.

On detecting disconnection of the multi-function peripheral 12, the bus driver 110 indicates to the Windows operating system that the previously declared multi-function peripheral 12 has been unplugged.

Figure 2:
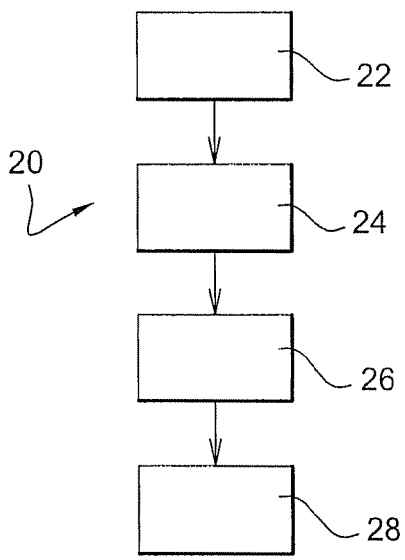
FIG. 2 shows a simplified flow chart of a preferred implementation of a method of the invention for communication between a host processing electronic device and a peripheral electronic device.

With reference to FIG. 2, in a particular implementation, the method 20 of communication between the host processing electronic device and the peripheral electronic device comprises, as seen from the host processing electronic device side, the following steps:

a step 22 for detecting a peripheral on connection of said peripheral;

a step 24 for detecting the data storage function following connection of the peripheral, which step is handled by a native driver;

a step 26 of declaring another peripheral function performed by the smart card reader bus driver, which step is handled by a corresponding non-native function driver; and a step 28 of declaring a smart card reader function generating a multi-function peripheral that is accessible from the host processing electronic device via a single, common interface.

Figure 3:
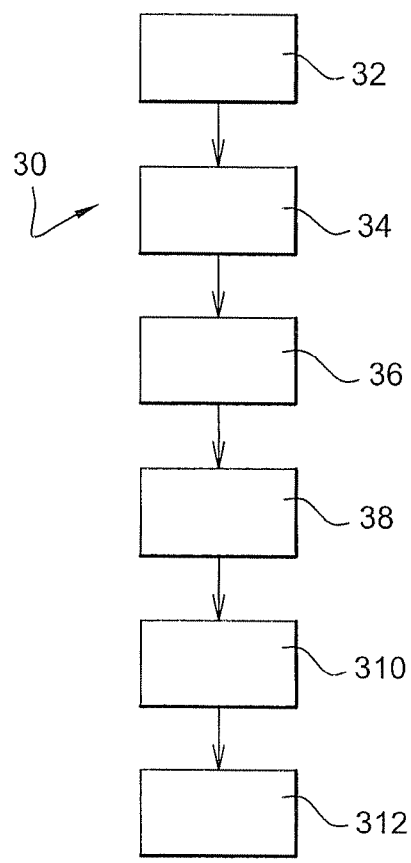
FIG. 3 shows a simplified flow chart of a preferred implementation of the invention for installing a driver of a smart card reader function that is not native within the operating system of a host processing electronic device.

As shown in FIG. 3, the method 30 of installing a non-native function of a peripheral having a plurality of functions comprises, as seen from the host processing electronic device, the following steps:

a step 32 of detecting a peripheral that includes a data storage unit of the CD-ROM type on connection of said peripheral; thus the data storage function is declared to the host processing electronic device;

a step 34 of running an auto-run file "AUTORUN.INF" present on the medium of the CD-ROM type data storage unit after reading has been performed by the operating system such as "Windows"; in a variant implementation (not shown), the auto-run file "AUTORUN.INF" includes only a link to an Internet site displaying a page including one or more smart card reader function drivers and smart card reader bus drivers, to which page a user is directed automatically when said user uses the host processing electronic device;

a step 36 of running applications present in the auto-run file "AUTORUN.INF" which is automatically searched for by the operating system of the host processing electronic device that reads the contents of the auto-run file; it is recalled that a computer application is a succession of tasks that can be run by a host;

a step 38 of pre-installing the non-native smart card reader driver, as is possible with the Windows operating system; such pre-installation consists in indicating to the operating system that a new peripheral with a smart card reader can be managed by the operating system in question; such pre-installation takes place by, for example, calling up a function entitled "SetupCopyOEMInf"

while specifying as a parameter a proprietary file of the "emXGM.inf" type. The characteristic points of an INF (information) file for a smart card reader are the indication of the class of the peripheral, e.g. "SmartCardReader", and the indication of a class unique identifier or "globally unique identifier (GUID)", such as, for example:

Class=SmartCardReader;
ClassGuid={50DD5230-BA8A-11D1-BF5D-0000F805F530}. and the identification of the peripheral by the bus class globally unique identifier (GUID) that is specifically created for this purpose:
% SCBus.DeviceDesc%=DriverInstallA, {A2E29779-504C-4617-8386-580F81187A66}\SCBus; and a step 310 of installing a smart card reader bus driver, which step consists in declaring the smart card reader bus driver; such an installation step is performed by using a utility such as the DevCon utility supplied by the driver of the Windows operating system or "Windows Driver Kit (WDK)" by the following line of commands:
devcon install GemXGMBus.inf "root\GEMXGMBus".

The characteristic points of an INF file for a smart card reader bus driver are the indication that that peripheral is of the System class and the indication of a unique class identifier such as a GUID, such as:
Class=System
ClassGuid={4D36E97D-E325-11CE-BFC1-08002BE10318}; and a step 312 of finalizing full installation of the non-native smart card reader driver.

Only the data storage function is thus declared to the host processing electronic device. Thus, no blockage, such as blocking of a CD-ROM that is being read is effected, and the multi-function peripheral is installed without any action from the user, thereby avoiding any manipulation error if the user is not sufficiently expert to handle such installation.

It should be noted that the method 30 of installing a non-native function of a multi-function peripheral precedes the method of communication between the host processing electronic device and the peripheral electronic device.

The preferred embodiment presented above is not intended to reduce the scope of the invention, and many modifications may be made to them without going beyond the ambit of the invention.

In particular, it should be noted that the person skilled in the art may, without showing any inventiveness, adapt the embodiment described to some other operating system presenting characteristics that are similar to the characteristics of the Windows operating system.

The invention claimed is:

1. A method of communication between a host processing electronic device and a peripheral electronic device, wherein
said peripheral electronic device includes a data storage means, a smart card reader means and a routing means,
said data storage means is separate from said smart card reader means, and communicates data by way of a first communication protocol,
said smart card reader means communicates data via a second communication protocol, and
said host processing electronic device and said peripheral electronic device are interconnected via at least one interface,
said method comprising the steps of:
detecting the peripheral electronic device upon connection of said peripheral electronic device;
declaring, by the peripheral device, a data storage function to the host processing electronic device;
converting, by the routing means of said peripheral electronic device, a command from said first communication protocol to said second communication protocol;
encapsulating, by the routing means of said peripheral electronic device, a response from said second communication protocol to said first communication protocol,
running an auto-run file, stored in said data storage means of said peripheral electronic device, said auto-run file automatically loading a reader bus driver on said host processing electronic device,
automatically loading and installing said reader bus driver on the host processing electronic device, said reader bus driver pre-installing a smart card reader driver on said host processing electronic device
automatically finalizing full installation of said smart card reader driver on said host processing electronic device, and
exchanging commands and responses between said smart card reader driver installed on said host processing electronic device and said smart card reader means of said peripheral electronic device through the interface via said first communication protocol.

2. A method of communication according to claim 1, wherein said host processing electronic device comprises an operating system and wherein said step of pre-installing said smart card reader driver includes indicating to said operating system that a new peripheral with a smart card reader can be managed by said operating system.

3. A method of communication according to claim 1, further comprising the steps of:
encapsulating, in said host processing device, a command generated by the smart card reader driver of said host processing device, from said second communication protocol to said first communication protocol; and
encapsulating, in said host processing device, a response received from said peripheral electronic device, from said first communication protocol to said second communication protocol, wherein
said reader bus driver sends said converted response to the smart card reader driver.

4. A method of communication according to claim 1, wherein said command is encapsulated from said second communication protocol to said first communication protocol by said smart card reader driver and wherein said response from said peripheral electronic device is converted from said first communication protocol to said second communication protocol by said smart card reader driver.

5. A method of communication according to claim 1, wherein said reader bus driver on said host processing electronic device is loaded from said peripheral electronic device.

6. A method of communication according to claim 1, wherein said interface is of Universal Serial Bus (USB) type.

7. An electronic system comprising:
a host processing electronic device and a peripheral electronic device interconnected via an interface, said peripheral electronic device comprising:
a data storage means communicating data according to a first communication protocol,
a smart card reader means, separate from said data storage means, communicating data according to a second communication protocol,
a routing means configured to convert a command from said first communication protocol to said second communication protocol and configured to encapsulate a response from said second communication protocol to said first communication protocol, and an auto-run file suitable for automatically loading a reader bus driver on said host processing electronic device, said reader bus driver pre-installing a smart card reader driver on said host processing electronic device, wherein data exchanged between said smart card reader driver on said host processing electronic device and said smart card reader means on said peripheral electronic device are exchanged through the interface by using said first communication protocol.

8. A method of communication according to claim 1, wherein said command is encapsulated from said second communication protocol to said first communication protocol by said reader bus driver on said host processing electronic device and wherein said response is converted from said first communication protocol to said second communication protocol by said reader bus driver on said host processing electronic device.

9. A method of communication according to claim 1, wherein said command is encapsulated from said second communication protocol to said first communication protocol by said smart card reader driver on said host processing electronic device and wherein said response is converted from said first communication protocol to said second communication protocol by said smart card reader driver on said host processing electronic device.

10. A method of communication according to claim 1, wherein said reader bus driver on said host processing electronic device is loaded from said peripheral electronic device.

11. A method of communication according to claim 2, wherein said reader bus driver on said host processing electronic device is loaded from said peripheral electronic device.

12. A method of communication according to claim 3, wherein said reader bus driver on said host processing electronic device is loaded from said peripheral electronic device.

13. A method of communication according to claim 4, wherein said reader bus driver on said host processing electronic device is loaded from said peripheral electronic device.

14. A method of communication according to claim 1, wherein said interface is of Universal Serial Bus (USB) type.

15. A method of communication according to claim 2, wherein said interface is of Universal Serial Bus (USB) type.

16. A method of communication according to claim 3, wherein said interface is of Universal Serial Bus (USB) type.

17. A method of communication according to claim 4, wherein said interface is of Universal Serial Bus (USB) type.

18. A method of communication according to claim 5, wherein said interface is of Universal Serial Bus (USB) type.

* * * * *